(12) United States Patent
Bannon

(10) Patent No.: US 9,810,145 B1
(45) Date of Patent: Nov. 7, 2017

(54) DUCTED IMPELLER

(71) Applicant: Philip C. Bannon, Marysville, WA (US)

(72) Inventor: Philip C. Bannon, Marysville, WA (US)

( * ) Notice: Subject to any disclaimer, the term of this patent is extended or adjusted under 35 U.S.C. 154(b) by 339 days.

(21) Appl. No.: 14/302,012

(22) Filed: Jun. 11, 2014

Related U.S. Application Data

(60) Provisional application No. 61/833,752, filed on Jun. 11, 2013.

(51) Int. Cl.
| | |
|---|---|
| *F02K 3/06* | (2006.01) |
| *F02C 3/107* | (2006.01) |
| *F02C 3/04* | (2006.01) |
| *B64D 29/06* | (2006.01) |
| *F01D 5/14* | (2006.01) |

(52) U.S. Cl.
CPC .............. *F02C 3/107* (2013.01); *B64D 29/06* (2013.01); *F01D 5/141* (2013.01); *F01D 5/148* (2013.01); *F02C 3/04* (2013.01); *F02K 3/06* (2013.01)

(58) Field of Classification Search
CPC ... F02K 3/00; F02K 3/02; F02K 3/025; F02K 3/04; F02K 3/06; F01D 5/12; F01D 5/14; F01D 5/141; F01D 5/148; F02C 3/04; F02C 3/045; F02C 3/107; B64D 29/00; B64D 29/02; B64D 29/04; B64D 29/06; B64D 29/08; B64D 2033/0206
See application file for complete search history.

(56) References Cited

U.S. PATENT DOCUMENTS

| | | | | |
|---|---|---|---|---|
| 5,141,400 | A * | 8/1992 | Murphy | B29C 43/18 416/204 A |
| 7,472,543 | B2 * | 1/2009 | Papamoschou | F02K 1/42 60/204 |
| 2002/0157378 | A1* | 10/2002 | Vogeler | F02C 6/003 60/226.1 |
| 2004/0011057 | A1* | 1/2004 | Huber | F02C 3/28 60/781 |
| 2004/0147798 | A1* | 7/2004 | MacWhinnie | F02C 3/22 588/316 |

(Continued)

*Primary Examiner* — Pascal M Bui Pho
*Assistant Examiner* — Marc Amar

(57) ABSTRACT

An engine assembly is configured to exceed Mach. The engine assembly has a casing mechanically coupled to a jet engine such that ducting exists between the casing and the jet engine. The jet engine further includes a low pressure compression stage configured to compress a gasses. A high pressure compression stage is connected to the low pressure compression stage and configured to further compress the gasses. A combustion stage is connected to the high pressure compression stage and configured to heat the gasses to three thousand degrees Fahrenheit by back pressure. A low pressure turbine is connected to the combustion stage and configured to utilize energy in the gasses so that there is very little emission from the low pressure turbine. A shaft is connected to the low pressure turbine and configured to turn as a result of the low pressure turbine. A ducted impeller has blades wherein the blades are widest at a blade tip, narrowing down to a hub, while not over lapping and beginning with a rotation of at least 45 degrees to the shaft and of a steeper angle going toward the hub to create an even air pressure along an entire length of each blade.

8 Claims, 2 Drawing Sheets

(56) References Cited

U.S. PATENT DOCUMENTS

| | | | |
|---|---|---|---|
| 2005/0188702 A1* | 9/2005 | Bachovchin | A61K 38/56 60/776 |
| 2006/0228206 A1* | 10/2006 | Decker | F01D 5/141 415/1 |
| 2013/0145769 A1* | 6/2013 | Norris | F02K 3/105 60/772 |
| 2016/0097290 A1* | 4/2016 | Fulayter | F01D 9/00 415/182.1 |

* cited by examiner

DUCTED IMPELLER

RELATED APPLICATION

This application claims priority to provisional patent application U.S. Ser. No. 61/833,752 filed on Jun. 11, 2013, the entire contents of which is herein incorporated by reference.

BACKGROUND

The embodiments herein relate generally to engine design.

Prior to embodiments of the disclosed invention, jet engines suffered from excessive noise, fuel consumption, speed limitations and air volume limitations. Embodiments of the disclosed invention solve this problem by pushing energy forward with exhaust.

SUMMARY

An engine assembly is configured to exceed Mach. The engine assembly has a casing mechanically coupled to a jet engine such that ducting exists between the casing and the jet engine. The jet engine further includes a low pressure compression stage configured to compress a gasses. A high pressure compression stage is connected to the low pressure compression stage and configured to further compress the gasses. A combustion stage is connected to the high pressure compression stage and configured to heat the gasses to three thousand degrees Fahrenheit by back pressure. A low pressure turbine is connected to the combustion stage and configured to utilize energy in the gasses so that there is very little emission from the low pressure turbine. A shaft is connected to the low pressure turbine and configured to turn as a result of the low pressure turbine. A ducted impeller has blades wherein the blades are widest at a blade tip, narrowing down to a hub, while not over lapping and beginning with a rotation of at least 45 degrees to the shaft and of a steeper angle going toward the hub to create an even air pressure along an entire length of each blade.

In some embodiments, the low pressure compression stage can further include a first low pressure compressor a second low pressure compressor and a third low pressure compressor connected to the shaft. The high pressure compression stage can further include a first high pressure compressor, a second high pressure compressor, a third high pressure compressor, a fourth high pressure compressor and a fifth high pressure compressor connected to the shaft. The combustion stage can further include a burner that burns fuel to heat the gasses in the combustion stage. The turbine stage can further include a first low pressure turbine, a second low pressure turbine and a third low pressure turbine, which operate to turn the shaft.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
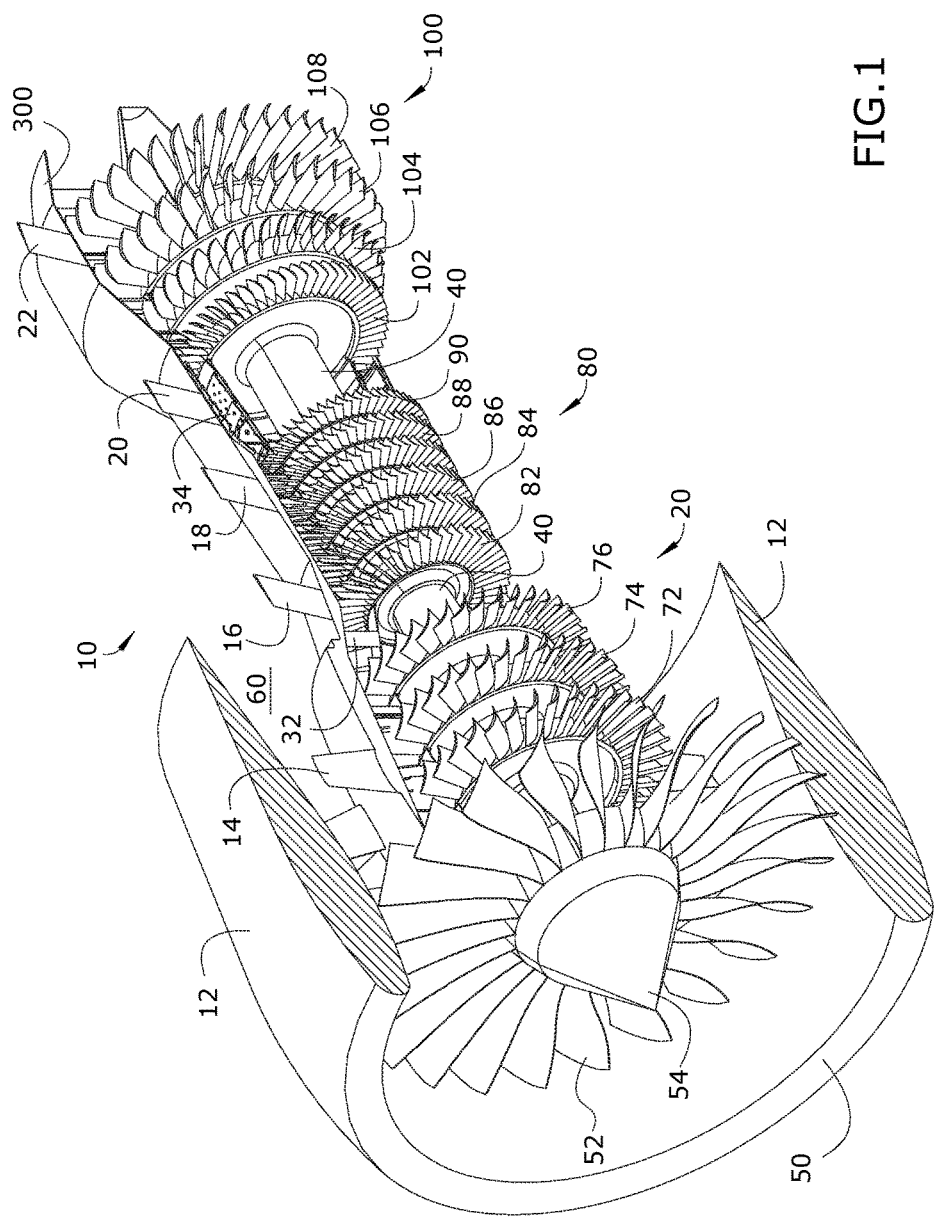
FIG. 1 shows perspective-cutaway view of an embodiment of the invention.
Figure 2:
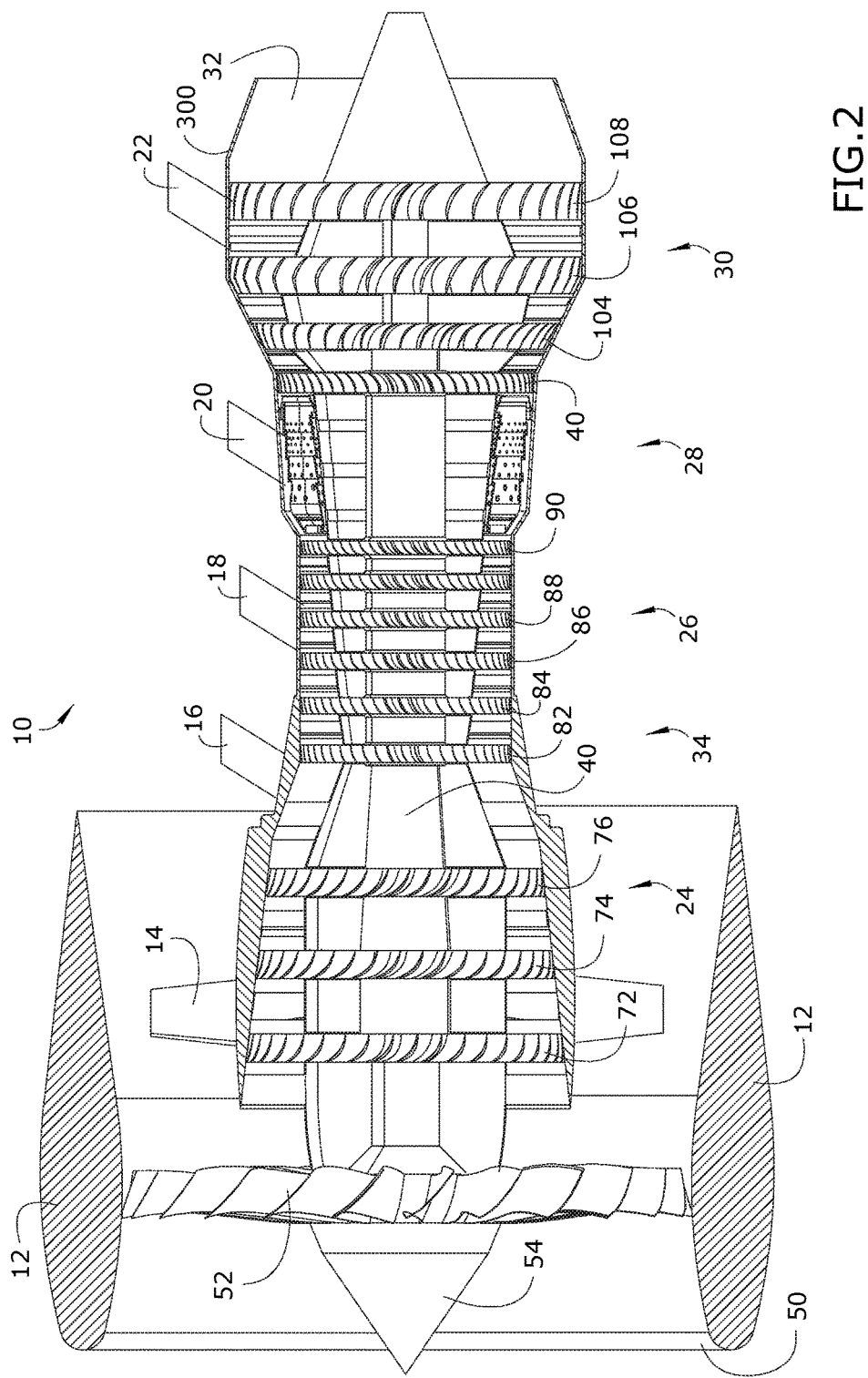
FIG. 2 shows a side profile view of an embodiment of the invention.

By way of example, and referring to FIG. 1, one embodiment of engine assembly 10 comprises casing 12. Jet engine 80 is attached to forward ducting panels 14, forward central ducting panels 16, central ducting panels 18 and rear central ducting panels 20, and rear ducting panel panels 22 within duct 60. Each of the ducting panels further comprises a root and extend outward to a tip. The root is attached to a jet engine casing 300 and the tip terminates within the duct 60 between the jet engine casing 300 and the casing 12. Jet engine 80 comprises low pressure compression stage 20, high pressure compression stage 26, combustion stage 28, low pressure turbine 30 and nozzle 32.

Turning to those components in more detail, low pressure compression stage 24 further comprises first low pressure compressor 72, second low pressure compressor 74 and third low pressure compressor 76. High pressure compressor 26 further comprises first high pressure compressor 82, second high pressure compressor 84, third high pressure compressor 86, fourth high pressure compressor 88 and fifth high pressure compressor 90. Combustion stage 28 comprises burner 34 that burns fuel to heat the air in the combustion stage. Turbine stage 30 comprises first low pressure turbine 104, second low pressure turbine 106 and third low pressure turbine 108, which operate to turn shaft 40. While passing through turbine 30, the gasses pass through gradually smaller areas, increasing the pressure into the final compressor, expanding into the final turbine which increases combustion temperature to about three thousand degrees Fahrenheit by back pressure, all the while producing more torque, where thrust was once needed and burning exhaust emissions again in the turbine stage which is a sequence of small to larger turbines. The larger turbines are to capture torque still available in the spent hot engine exhaust, gases pass out of the exhaust nozzle at lower speed and mix with fresh air to complete burning of emissions giving the engine very little added thrust and very little emissions.

Shaft 40 is mechanically coupled to impeller fan 52, which is further attached to tip 54 in nacelle 50. In addition to powering the compressors, the shaft turns impeller fan 52 which causes air to pass through duct 60 and around jet engine 34. In an improvement over the prior art impeller fan 52 can rotate at a high speed and produce thrust over Mach impeller blade tip speed thus resulting in a Mach speed aircraft. Air passing through duct 60 both produces thrust and cools jet engine 34. Impeller fan 52 further comprises blades that are arranged as follows: no two blades are to overlap. The blades are to be at the widest at the blade tip, narrowing down to the hub, all the while not over lapping and begin at minimum 45 degrees to shaft and of a steeper angle going towards the hub this is to create even air pressure along the entire length of each blade.

In some embodiments, the ducted fan dramatically reduces fuel consumption, turbine size, noise and pollution. The highest to date combustion temperature during a complete fuel burn is now possible due to the increased work and torque or lugging the shaft 40 is now subjected to via the compressor fans. In some embodiments, the impeller or turbo fan blade tip speed can exceed the speed of sound. In some embodiments, the engine is a sub-mock design. This design can be a low RPM turbine. Turbine RPM can be the manufacturer model option.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An engine assembly comprising:
   a casing mechanically coupled to a jet engine casing wherein the jet engine casing is further attached to a plurality of ducting panels including:
   forward ducting panels,
   a forward central ducting panel,
   a rear central ducting panel, and
   rear ducting panels,
   wherein each of the plurality of ducting panels extends radially outward from a root of each of the plurality of ducting panels to a tip of each of the plurality of ducting panels;
   wherein the root of each of the plurality of ducting panels is attached to the jet engine casing and the tip of each of the plurality of ducting panels terminates at a free end of each of the plurality of ducting panels,
   wherein the free end of each forward ducting panel is located within a flowpath between the jet engine casing and the casing and the root of each forward ducting panel is located forward of a combustion stage with respect to a longitudinal axis of the engine assembly,
   wherein the engine assembly further comprises:
   a low-pressure compression stage configured to compress gasses;
   a high-pressure compression stage, connected to the low-pressure compression stage and configured to further compress the gasses;
   a turbine stage connected to the combustion stage and configured to utilize energy in the gasses;
   a shaft, connected to the turbine stage, and configured to turn as a result of the turbine stage; and
   a ducted impeller comprising blades that are widest at a blade tip, narrowing down to a hub, while not over lapping and beginning with a rotation of 45 degrees measured from an axis of the shaft to a blade chord and of a smaller angle going toward the hub to create an even air pressure along an entire length of each blade,
   wherein the combustion stage is connected to the high-pressure compression stage and configured to heat the gases to three thousand degrees Fahrenheit by back pressure.

2. The engine assembly of claim 1, wherein the low-pressure compression stage further comprises: a first low-pressure compressor, a second low-pressure compressor and a third low-pressure compressor connected to the shaft.

3. The engine assembly of claim 1, wherein the high-pressure compression stage further comprises a first high-pressure compressor, a second high-pressure compressor, a third high-pressure compressor, a fourth high-pressure compressor and a fifth high-pressure compressor connected to the shaft.

4. The engine assembly of claim 1, wherein the combustion stage further comprises a burner that burns fuel to heat the gasses in the combustion stage.

5. The engine assembly of claim 1, wherein turbine stage comprises a first low-pressure turbine, a second low-pressure turbine and a third low-pressure turbine, which operate to turn the shaft.

6. A ducted fan of an engine assembly, configured to direct air around a rotational device, the ducted fan comprising:
   a casing mechanically coupled to a jet engine casing wherein the jet engine casing is further attached to a plurality of ducting panels including:
   forward ducting panels,
   a forward central ducting panel,
   a rear central ducting panel and
   rear ducting panels,
   wherein each of the plurality of ducting panel extends radially outward from a root of each of the plurality of ducting panels to a tip of each of the plurality of ducting panels;
   wherein the root of each of the plurality of ducting panels is attached to the jet engine casing,
   wherein the tip of each of the plurality of ducting panels terminates at a free end of each of the plurality of ducting panels,
   wherein the free end of each forward ducting panel is located within a flowpath between the jet engine casing and the casing and the root of each forward ducting panel is located forward of a combustion stage with respect to a longitudinal axis of the engine assembly,
   wherein the ducted fan further comprises:
   blades that are widest at a blade tip, narrowing down to a hub, while not over lapping and beginning with a rotation of at least 45 degrees measured from an axis of a shaft to a blade chord and of a smaller angle going toward the hub to create an even aft pressure along an entire length of each blade.

7. The ducted fan of claim 6, wherein the jet engine casing houses the rotational device.

8. The ducted fan of claim 7, rotational device turns the shaft.

* * * * *